(12) United States Patent
van Grieken et al.

(10) Patent No.: US 8,870,495 B2
(45) Date of Patent: Oct. 28, 2014

(54) VESSEL AND METHOD FOR LAYING A PIPELINE

(75) Inventors: Gerardus Cornelius van Grieken, Noordwijkerhout (NL); Timotheus Johannes Rutten, Oegstgeest (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 273 days.

(21) Appl. No.: 13/133,787

(22) PCT Filed: Dec. 15, 2009

(86) PCT No.: PCT/NL2009/000256
§ 371 (c)(1),
(2), (4) Date: Jun. 9, 2011

(87) PCT Pub. No.: WO2010/071412
PCT Pub. Date: Jun. 24, 2010

(65) Prior Publication Data
US 2011/0250019 A1 Oct. 13, 2011

Related U.S. Application Data

(60) Provisional application No. 61/139,246, filed on Dec. 19, 2008.

(30) Foreign Application Priority Data

Dec. 19, 2008 (NL) .................................. 2002351

(51) Int. Cl.
*F16L 1/19* (2006.01)
*F16L 1/20* (2006.01)
*F16L 1/23* (2006.01)

(52) U.S. Cl.
CPC . *F16L 1/19* (2013.01); *F16L 1/202* (2013.01); *F16L 1/207* (2013.01); *F16L 1/23* (2013.01)

USPC .......................................................... 405/166

(58) Field of Classification Search
USPC ............ 405/158, 166, 167, 169, 170; 175/85, 175/161; 166/341, 342
See application file for complete search history.

(56) References Cited

U.S. PATENT DOCUMENTS

| 4,834,604 A | 5/1989 | Brittain et al. |
| 6,273,643 B1 | 8/2001 | Baugh |

(Continued)

FOREIGN PATENT DOCUMENTS

| EP | 0 020 257 A1 | 12/1980 |
| EP | 1779013 | 5/2007 |

(Continued)

OTHER PUBLICATIONS

English Translation of EP 0020257.

*Primary Examiner* — Benjamin Fiorello
*Assistant Examiner* — Kyle Armstrong
(74) *Attorney, Agent, or Firm* — John S. Sopko; Hoffmann & Baron, LLP

(57) ABSTRACT

A pipeline laying vessel (1) for laying a pipeline (2) on a seabed, said vessel (1) comprising a J-lay system (4) defining a firing line (5) along which the pipeline (2) is laid, the J-lay system (4) comprising an alignment device (6) for aligning a pipe section (7) with the pipeline (2) suspended from the J-lay system (4) with a sufficient level of accuracy to allow the pipe section (7) to be welded to the pipeline (2), the alignment device (6) being constructed to maintain the alignment during at least a part of the welding operation of the pipe section (7) to the pipeline (2), wherein the alignment device (6) is movable between a first position (10) in the firing line (5) and a second position (11) outside the firing line (5), and the alignment device (6) is constructed to engage a pipe section (7) in the second position (11) and to be moved into the first position (10) together with the engaged pipe section (7).

21 Claims, 15 Drawing Sheets

(56) References Cited

U.S. PATENT DOCUMENTS

| | | |
|---|---|---|
| 6,634,443 B1 * | 10/2003 | Paech et al. ............ 175/85 |
| 7,189,028 B1 | 3/2007 | Signaroldi et al. |
| 2002/0159839 A1 | 10/2002 | Frijns et al. |
| 2005/0100413 A1 | 5/2005 | Baugh |
| 2007/0258772 A1 | 11/2007 | Bursaux et al. |
| 2010/0260552 A1 * | 10/2010 | Hillenaar et al. ......... 405/166 |

FOREIGN PATENT DOCUMENTS

| | | |
|---|---|---|
| EP | 1779013 B1 | 5/2008 |
| NL | 1013315 C1 | 11/1999 |
| WO | 2006016798 A1 | 2/2006 |
| WO | WO 2006085739 A1 * | 8/2006 |

* cited by examiner

VESSEL AND METHOD FOR LAYING A PIPELINE

CROSS-REFERENCE TO RELATED APPLICATIONS

This application is the National Stage of International Application No. PCT/NL2009/000256, filed Dec. 15, 2009, which claims the benefit of Netherlands Application No. NL 2002351, filed Dec. 19, 2008, and U.S. Provisional Application No. 61/139,246, filed Dec. 19, 2008, the contents of all of which are incorporated by reference herein.

FIELD OF THE INVENTION

The invention relates to a pipeline laying vessel for laying a pipeline on a seabed, said vessel comprising a J-lay system defining a firing line along which the pipeline is laid, an alignment device for aligning a pipe section with the pipeline suspended from the J-lay system.

BACKGROUND OF THE INVENTION

During the laying of a pipeline with the known vessel, a pipe section is first positioned in the firing line and then positioned in and engaged by the alignment device. The alignment device is used to align the pipe section with the pipeline suspending from the J-lay system. Subsequently, the aligned pipe section is connected to the pipeline. A disadvantage of the known pipelaying vessel is that the laying of the pipeline is slow. The use of this type of pipelaying vessel is extremely expensive and therefore every second of reduction in the critical production cycle time results in a large advantage.

SUMMARY OF THE INVENTION

The pipelaying vessel according to the invention comprises a J-lay system defining a firing line along which the pipeline is laid, the J-lay system comprising an alignment device for aligning a pipe section with the pipeline suspended from the J-lay system with a sufficient level of accuracy to allow the pipe section to be welded to the pipeline, the alignment device being constructed to maintain the alignment during at least a part of the welding operation of the pipe section to the pipeline, wherein the alignment device is movable between a first position in the firing line and a second position outside the firing line, and the alignment device is constructed to engage a pipe section in the second position and to be moved into the first position together with the engaged pipe section.

The pipelaying vessel according to the invention solves the problem of the known vessel. In the pipelaying vessel according to the invention, the pipe section is positioned in and engaged by the alignment device outside the firing line. Due to this, said positioning in and engaging by the alignment device can be performed simultaneously with other pipe laying operations in the firing line. Therefore, operations which with the known vessel are performed subsequently can with the vessel according to the invention be performed simultaneously. This allows the pipelaying vessel according to the invention to lay a pipeline faster that the known pipelaying vessel. This means that the pipelaying vessel according to the invention reduces the critical production cycle time when compared with the known vessel.

In an embodiment of the pipelaying vessel according to the invention, the vessel comprises a pipe section loader for positioning a pipe section substantially parallel to the firing line and near or in the alignment device located in the second position. The alignment device may be independently movable relative to the pipe section loader. The alignment device may be free from a connection to the pipe section loader.

In a further embodiment of the pipelaying vessel according to the invention, the alignment device is free from a connection to the J-lay system. The vessel may comprise a deck, and the alignment device may be connected to the deck of the vessel. The alignment device may be connected to the vessel via a J-lay pivot connection which pivotably connects the J-lay system to the vessel.

The pipe section loader may be constructed to move the pipe section in a direction of the longitudinal axis of said pipe section. The pipe section loader may be constructed to move the pipe section in a direction of the longitudinal axis of said pipe section for positioning the pipe section in the alignment device located in the second position. The pipe section loader may comprise holding means for engaging the pipe section. The holding means may be constructed to move the pipe section in the direction of the longitudinal axis of said pipe section.

The alignment device may be pivotable about an alignment pivot axis and between the first position and the second position. The alignment pivot axis may extend substantially parallel to the firing line.

The alignment device may comprise an alignment drive for moving the alignment device between the first position and the second position. The pipe section loader may be pivotable about a loader pivot axis. A loader drive for moving the pipe section loader may be provided. The J-lay system may be pivotable about a J-lay pivot axis. A J-lay drive for moving the J-lay system may be provided. The loader pivot axis and the J-lay pivot axis may extend substantially parallel to each other. The loader pivot axis and the J-lay pivot axis may substantially coincide.

The J-lay system may comprise a movable suspension member configured to move along the firing line between an upper position and a lower position, the movable suspension member being constructed to move a pipeline and/or a pipe section along the firing line.

The suspension member may further be movable;
from the lower position to a remote lower position in which the suspension member is located outside the firing line,
from the remote lower position to a remote upper position in which the suspension member is located outside the firing line, and
from the remote upper position to the upper position.

The suspension member may be configured to move from the remote lower position to the remote upper position while being located outside the firing line. The suspension member may be configured to move along a first endless trajectory extending successively
from the upper position to the lower position,
from the lower position to the remote lower position,
from the remote lower position to the remote upper position, and
from the remote upper position to the upper position.

The suspension member may be movable;
from the lower position to the upper position,
from the upper position to the remote upper position,
from the remote upper position to the remote lower position, and
from the remote lower position to the lower position.

The suspension member may be configured to move along a second endless trajectory extending successively
from the lower position to the upper position,
from the upper position to the remote upper position, from the remote upper position to the remote lower position, and from the remote lower position to the lower position.

The J-lay system may comprise member driving means for moving the suspension member;

from the upper position to the lower position, from the lower position to the remote lower position, from the remote lower position to the remote upper position, and from the remote upper position to the upper position.

The member driving means may be constructed to move the suspension member:

from the lower position to the upper position, from the upper position to the remote upper position, from the remote upper position to the remote lower position, from the remote lower position to the lower position.

The invention further relates to a method for laying a pipeline on a seabed with a pipeline laying vessel comprising a J-lay system for laying a pipeline along a firing line, the J-lay system comprising an alignment device for aligning a pipe section with the pipeline suspended from the J-lay system with a sufficient level of accuracy to allow the pipe section to be welded to the pipeline, the alignment device being constructed to maintain the alignment during at least a part of the welding operation of the pipe section to the pipeline, wherein the alignment device is movable between a first position in the firing line and a second position outside the firing line, and the method comprises engaging a pipe section with the alignment device in the second position and moving the alignment device into the firing line together with the engaged pipe section.

In an embodiment of the method according to the invention, the vessel comprises a pipe section loader for positioning a pipe section, the pipe section loader comprises holding means for engaging the pipe section, and the pipe section loader moves simultaneously with the alignment device during the moving of the engaged pipe section into the firing line.

In a further embodiment of the method according to the invention, the method comprises a first previous step of positioning the alignment device in the second position.

In a further embodiment of the method according to the invention, the vessel comprises a pipe section loader for positioning a pipe section, and the method comprises a second previous step of positioning the pipe section with the pipe section loader substantially parallel to the firing line and near or in the alignment device located in the second position.

The method may comprise a first subsequent step of after connecting the pipe section to the pipe line disengaging the alignment device from the pipe section and moving the alignment device in the second position.

The method may comprise a second subsequent step of positioning a further pipe section with the pipe section loader substantially parallel to the firing line and near or in the alignment device located in the second position, while the connection of the pipe section is completed and/or treated and/or the pipe section is lowered towards the seabed.

The method may comprise the step of engaging the pipe section in the firing line with the suspension member and disengaging the pipe section loader from the pipe section before connecting the pipe section with the pipe line.

The invention further relates to a pipeline laying vessel for laying a pipeline on a seabed, comprising a J-lay system defining a firing line along which the pipeline is laid, said J-lay system comprising a movable suspension member configured to move along the firing line between an upper position and a lower position, the movable suspension member being constructed to move a pipeline and/or a pipe section along the firing line. In the known pipelaying vessel, the pipeline and/or pipe section is lowered by the suspension member. The upper position and the lower position are located in the firing line. During said lowering of the pipeline and/or a pipe section, the suspension member is lowered to the lower position while being located in the firing line. After that, the suspension member is raised to the upper position for lowering a subsequent pipeline and/or a pipe section. During said raising the suspension member is raised while being located in the firing line. A disadvantage of the known pipelaying vessel is that the laying of the pipeline is slow.

The pipeline laying vessel according to the invention comprises a J-lay system defining a firing line along which the pipeline is laid, said J-lay system comprising a movable suspension member configured to move along the firing line between an upper position and a lower position, the movable suspension member being constructed to move a pipeline and/or a pipe section along the firing line, wherein the suspension member is further movable;

from the lower position to a remote lower position in which the suspension member is located outside the firing line, from the remote lower position to a remote upper position in which the suspension member is located outside the firing line, and from the remote upper position to the upper position.

The pipelaying vessel according to the invention solves the problem of the known vessel. In the pipelaying vessel according to the invention, the suspension member is after lowering the pipeline, placed outside the firing line. This allows that at least a large part of the raising of the suspension member from the lower position to the upper position occurs such that the suspension member is located outside the firing line. Due to this, it is possible to performing said raising of the suspension member simultaneously with other pipe laying operations in the firing line. Therefore, operations which with the known vessel are performed subsequently can with the vessel according to the invention be performed simultaneously. This allows the pipelaying vessel according to the invention to lay a pipeline faster that the known pipelaying vessel. This means that the pipelaying vessel according to the invention reduces the critical production cycle time when compared with the known vessel.

In an embodiment of the pipelaying vessel according to the invention, the suspension member is configured to move from the remote lower position to the remote upper position while being located outside the firing line.

The suspension member may be configured to move along a first endless trajectory extending successively from the upper position to the lower position, from the lower position to the remote lower position, from the remote lower position to the remote upper position, from the remote upper position to the upper position.

The suspension member may be movable;

from the lower position to the upper position, from the upper position to the remote upper position, from the remote upper position to the remote lower position, and from the remote lower position to the lower position.

The suspension member may be configured to move along a second endless trajectory extending successively from the lower position to the upper position, from the upper position to the remote upper position, from the remote upper position to the remote lower position, and from the remote lower position to the lower position.

The J-lay system may comprise member driving means for moving the suspension member;
from the upper position to the lower position,
from the lower position to the remote lower position,
from the remote lower position to the remote upper position, and
from the remote upper position to the upper position.

The member driving means may be constructed to move the suspension member:
from the lower position to the upper position,
from the upper position to the remote upper position,
from the remote upper position to the remote lower position,
from the remote lower position to the lower position.

The invention further relates to a method for laying a pipeline on a seabed with a pipeline laying vessel comprising a J-lay system defining a firing line along which the pipeline is laid, said J-lay system comprising a movable suspension member configured to move along the firing line between an upper position and a lower position, the movable suspension member being constructed to move a pipeline and/or a pipe section along the firing line, and the method comprises moving the suspension member;
from the lower position to a remote lower position in which the suspension member is located outside the firing line,
from the remote lower position to a remote upper position in which the suspension member is located outside the firing line, and
from the remote upper position to the upper position.

The method may comprise moving the suspension member from the remote lower position to the remote upper position while being located outside the firing line.

The method may comprises moving the suspension member along a first endless trajectory extending successively
from the upper position to the lower position,
from the lower position to the remote lower position,
from the remote lower position to the remote upper position,
from the remote upper position to the upper position.

The method may comprise moving the suspension member;
from the lower position to the upper position,
from the upper position to the remote upper position,
from the remote upper position to the remote lower position,
from the remote lower position to the lower position.

The method may comprise moving the suspension member along a second endless trajectory extending successively
from the lower position to the upper position,
from the upper position to the remote upper position,
from the remote upper position to the remote lower position,
from the remote lower position to the lower position.

The invention further relates to the use of a pipelaying vessel according to the invention.

BRIEF DESCRIPTION OF THE DRAWINGS

Embodiments of the invention will be described in detail with reference to the accompanying figures in which.

DETAILED DESCRIPTION OF THE INVENTION

Figure 1:
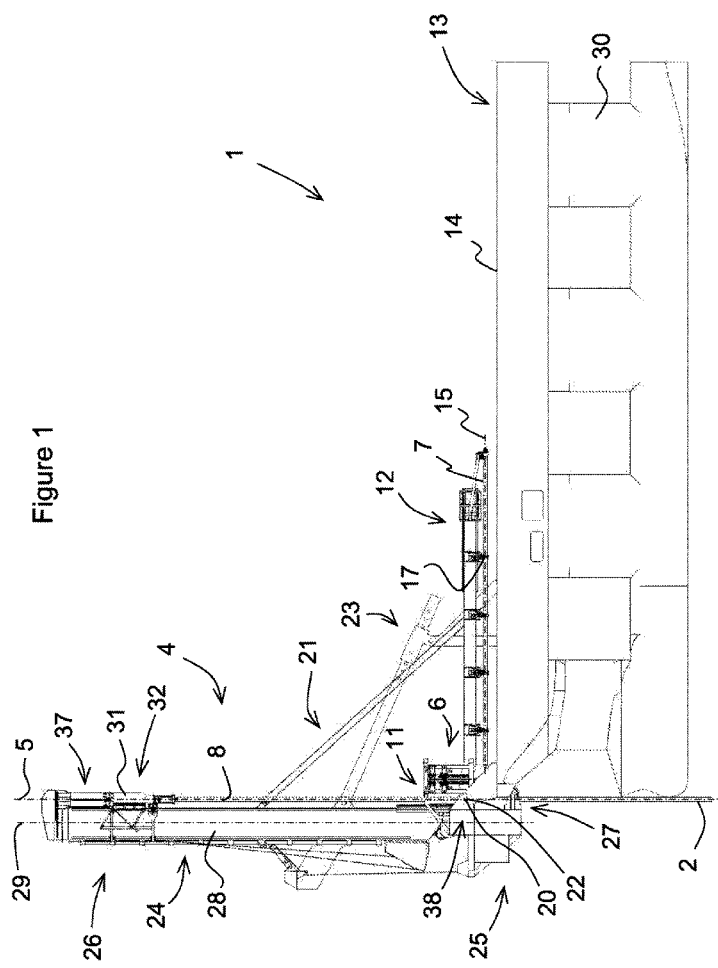
FIG. 1 schematically shows a side view of an embodiment of a pipe laying vessel according to the invention, and FIGS. 2-15 schematically show enlarged perspective views of the J-lay system, alignment device, pipe section loader and suspension member of the vessel of FIG. 1.

FIG. 1 schematically shows a side view of an embodiment of a pipe laying vessel according to the invention. The pipeline laying vessel 1 for laying a pipeline 2 on a seabed comprises a J-lay system 4 defining a firing line 5 along which the pipeline 2 is laid. The J-lay system 4 further comprises an alignment device 6 for aligning a pipe section 7 with the pipeline 2 suspended from the J-lay system 4. The alignment device 6 is constructed to align the pipe section 7 with a sufficient level of accuracy to weld the pipe section 7 end-to-end to the pipeline 2. Typical line up accuracies lie in the range of 0.1 to 0.5 mm for riser pipes and 0.5 to 2 mm for flowline pipes. The alignment device 6 is movable between a first position (see 10 of FIG. 8) in the firing line 5 and a second position 11 outside the firing line 5. The alignment device 6 is constructed to engage a pipe section 7 in the second position 11 and to be moved into the first position 10 together with the engaged pipe section 7.

The vessel 1 comprises a pipe section loader 12 for positioning a pipe section 7 substantially parallel to the firing line 5 and near or in the alignment device 6 located in the second position 11. The alignment device 6 is independently movable relative to the pipe section loader 12. The alignment device 6 is connected the vessel 1 via a J-lay pivot connection 38 which pivotably connects the J-lay system 4 to the vessel 1.

The pipe section loader 12 is constructed to move the pipe section 7 in a direction of the longitudinal axis 15 of said pipe section 7 for positioning the pipe section 7 in the alignment device 6 located in the second position 11. The pipe section loader 12 comprises holding means 17 for engaging the pipe section 7. The holding means 17 are constructed to move the pipe section 7 in the direction of the longitudinal axis 15 of said pipe section 7.

The alignment device 6 is pivotable about an alignment pivot axis (see 18 of FIG. 2) and between the first position 10 and the second position 11. The alignment pivot axis 18 extends substantially parallel to the firing line 5. The alignment device 6 comprises an alignment drive (not shown) for moving the alignment device 6 between the first position 10 and the second position 11.

The pipe section loader 12 is pivotable about a loader pivot axis 20. A loader drive 21 for moving the pipe section loader 12 is provided. The J-lay system 4 is pivotable about a J-lay pivot axis 22. A J-lay drive 23 for moving the J-lay system 4 is provided. The loader pivot axis 20 and the J-lay pivot axis 22 extend substantially parallel to each other. The loader pivot axis 20 and the J-lay pivot axis 22 substantially coincide.

The J-lay system 4 comprises an elongated structure 24. The elongated structure 24 comprises a tubular body 28 with a longitudinal axis 29.

The J-lay system 4 comprises hang-off means 27 such as a hang-off table. The J-lay system further comprises a welding station 41 positioned above the hang-off table.

FIGS. 2-15 show enlarged views of the J-lay system, alignment device, pipe section loader and suspension member of the vessel of FIG. 1. The J-lay system 4 comprises a movable suspension member 31 configured to move along the firing line 5 between an upper position 32 (FIG. 2) and a lower position 33 (FIG. 5). The movable suspension member 31 is constructed to move the pipeline 2 and/or the pipe section 7 and 8 along the firing line 5. The suspension member 31 is further be movable;
from the lower position 33 to a remote lower position 34 (FIG. 7) in which the suspension member 31 is located outside the firing line 5,
from the remote lower position 34 to a remote upper position 35 (FIG. 9) in which the suspension member 31 is located outside the firing line 5, and
from the remote upper position 35 to the upper position 35.

The suspension member 31 is configured to move from the remote lower position 34 to the remote upper position 35 while being located outside the firing line 5. The suspension member 31 is configured to move along an endless trajectory extending successively from the upper position 32 to the lower position 33,
from the lower position 33 to the remote lower position 34,
from the remote lower position 34 to the remote upper position 35,
from the remote upper position 35 to the upper position 32.

The FIGS. 2-15 show different steps of an embodiment of the method for laying a pipeline according to the invention. The invention may relate to (one or more parts of) one or any combination of the steps shown in the FIGS. 2-15.

Figure 2:
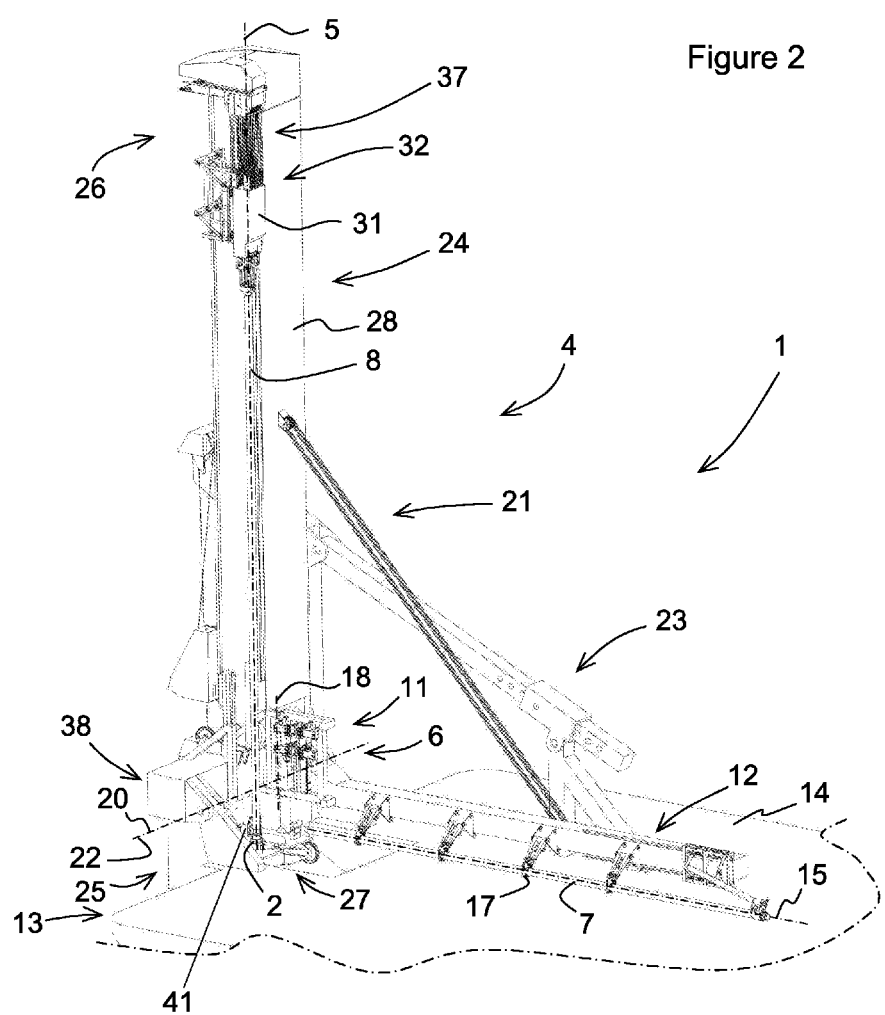
Figure 3:
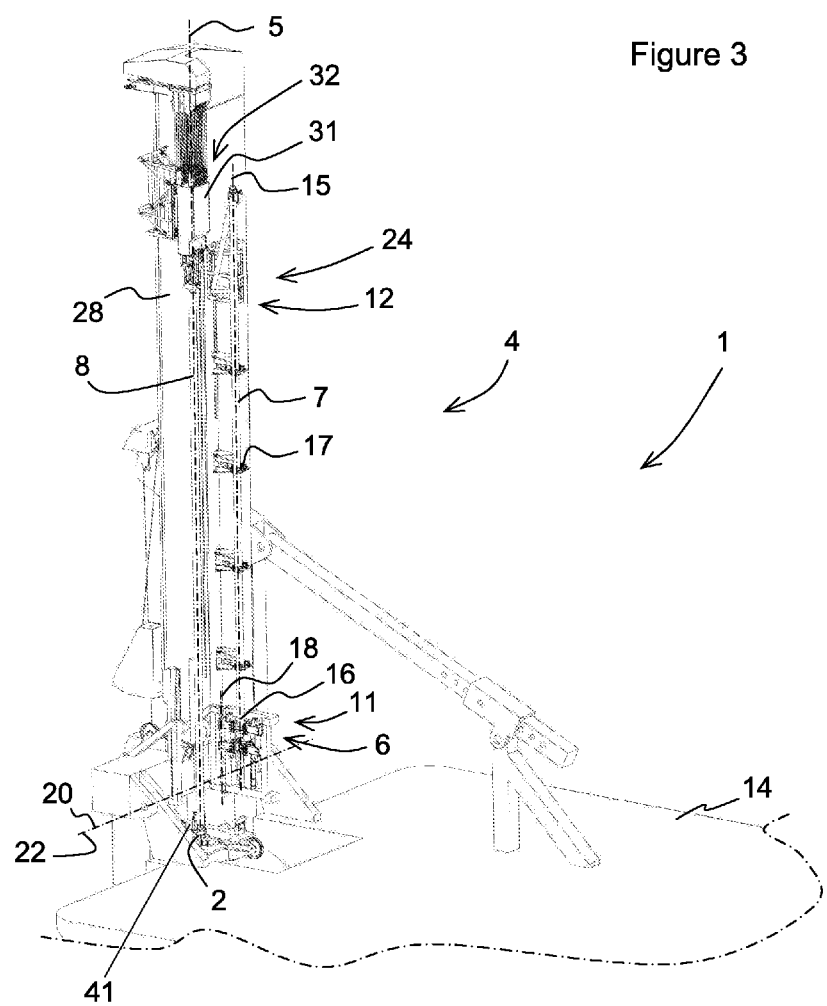

FIG. 2 shows a step wherein the alignment device 6 is positioned in the second position 11. The pipe section loader 12 is positioned substantially parallel to the deck surface 14 and is holding a first pipe section 7 with the holding means 17. The holding means 17 are constructed to move the pipe section 7 along its longitudinal axis 15. The suspension member 31 is located in the in upper position 32 and is holding a second pipe section 8 connected to the pipeline 2. FIG. 3 shows a subsequent step wherein the pipe section loader 12 is moved to position the first pipe section 7 substantially parallel to the firing line 5 and in the alignment device 6 located in the second position 11.

Figure 4:
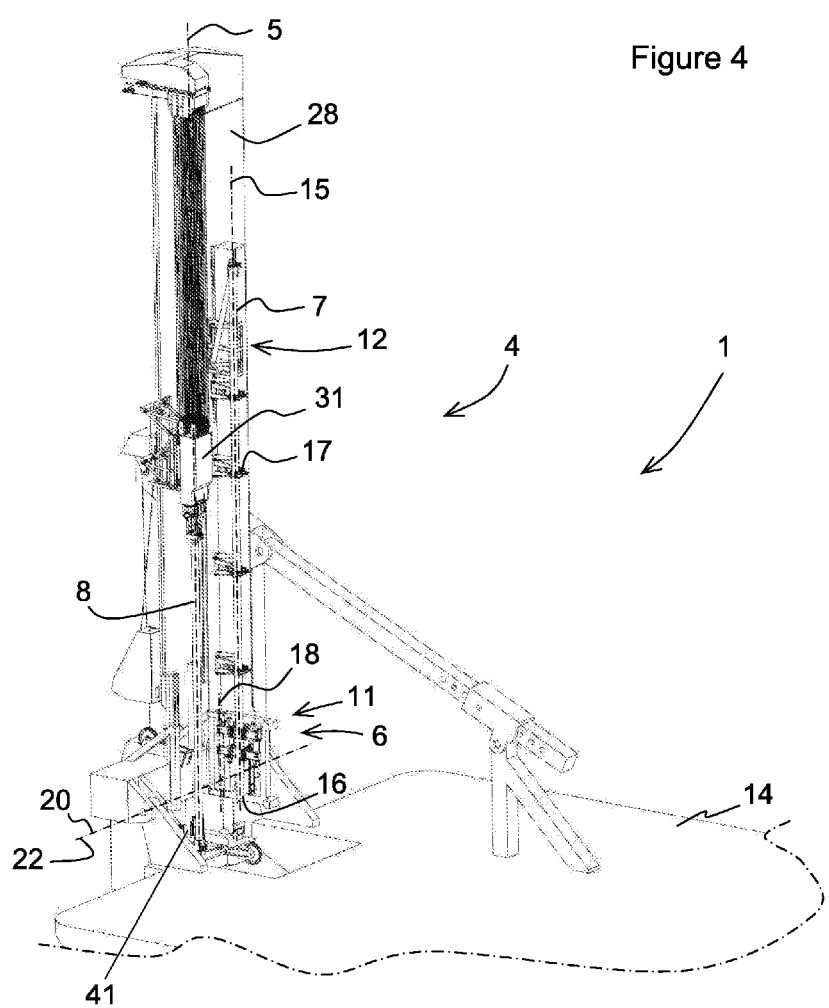
Figure 5:
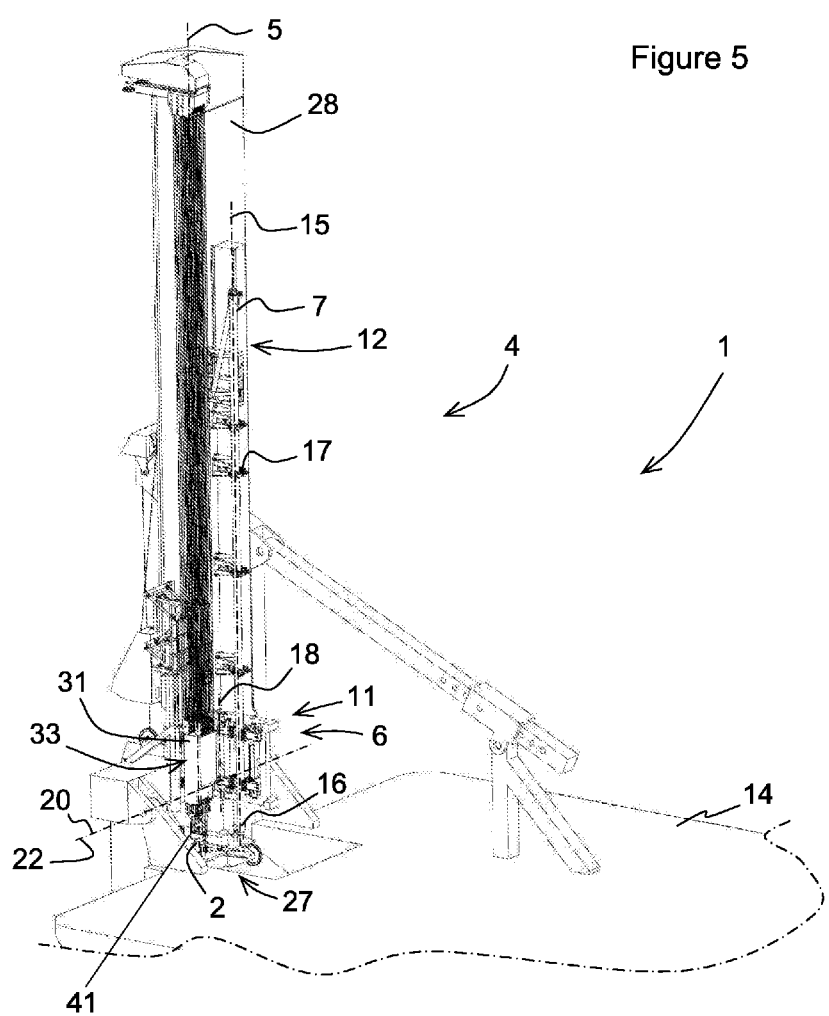

FIG. 4 shows a subsequent step wherein the first pipe section 7 located in alignment device 6 is lowered by the pipe section loader 12. The suspension member 31 is lowered to a position between the upper position 32 and the lower position 33. This way the second pipe section 8 is partly lowered. The first pipe section 7 is lowered in the alignment device 6 with the holding means 17 such that the lower end 16 of the first pipe section 7 protrudes below the alignment device 6.

FIG. 5 shows a subsequent step wherein the first pipe section 7 is engaged by the alignment device 6 located in the second position 11. The suspension member 31 is lowered into the lower position 33. The second pipe section 8 is fully lowered and fixated by the hang off means 27. The second pipe second 8 is now forming the pipeline 2. The first pipe section 7 is lowered in the alignment device 6 with the holding means 17 such that the lower end 16 of the first pipe section 7 is positioned at a height near but above the height of the pipeline 2 suspending from the hang off means 27.

Figure 6:
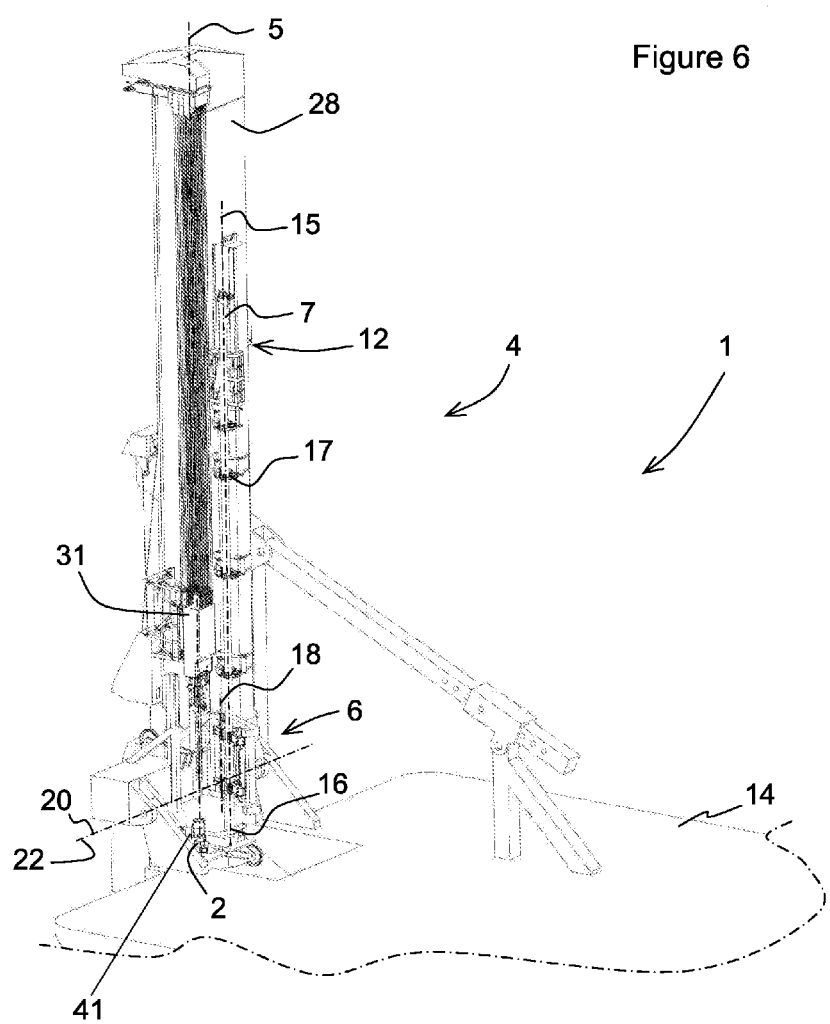

FIG. 6 shows a subsequent step wherein the suspension member 31 is disconnected from pipeline 2 raised from the lower position 33. The alignment device 6 with the engaged first pipe section 7 is moved from the second position 11 towards the first position 10.

Figure 7:
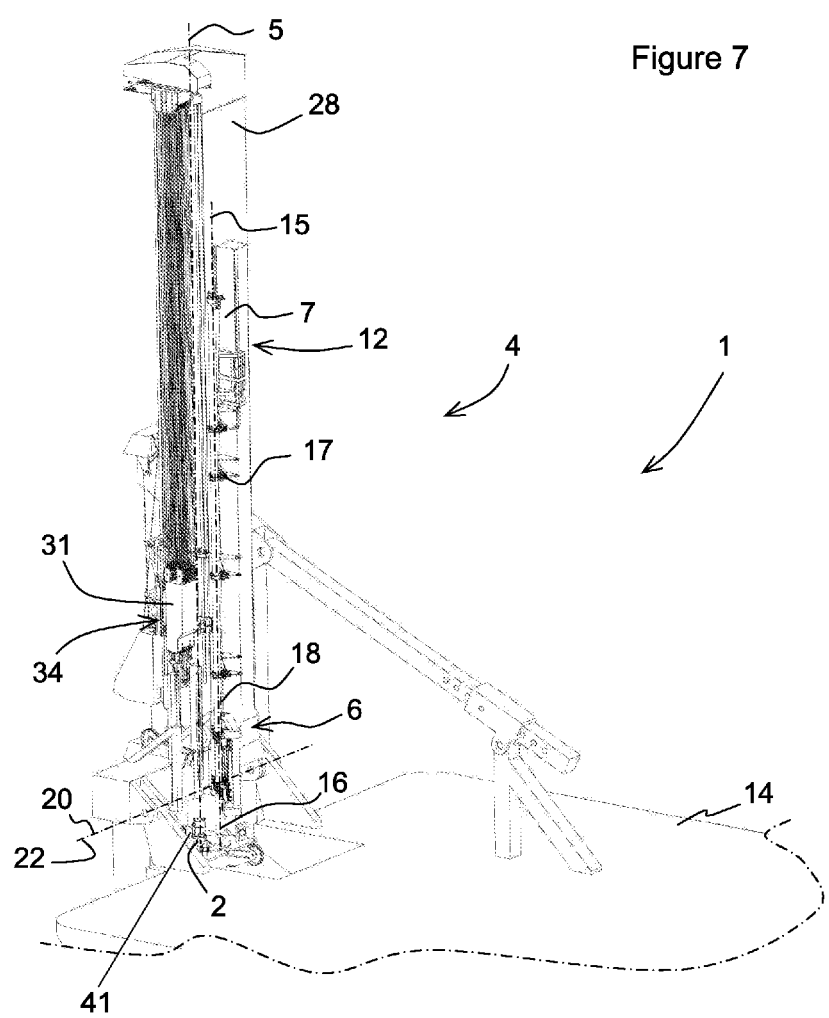

FIG. 7 shows a subsequent step wherein the suspension member 31 is positioned in the remote lower position 34. The alignment device 6 with engaged first pipe section 7 is moved further towards the first position 10.

Figure 8:
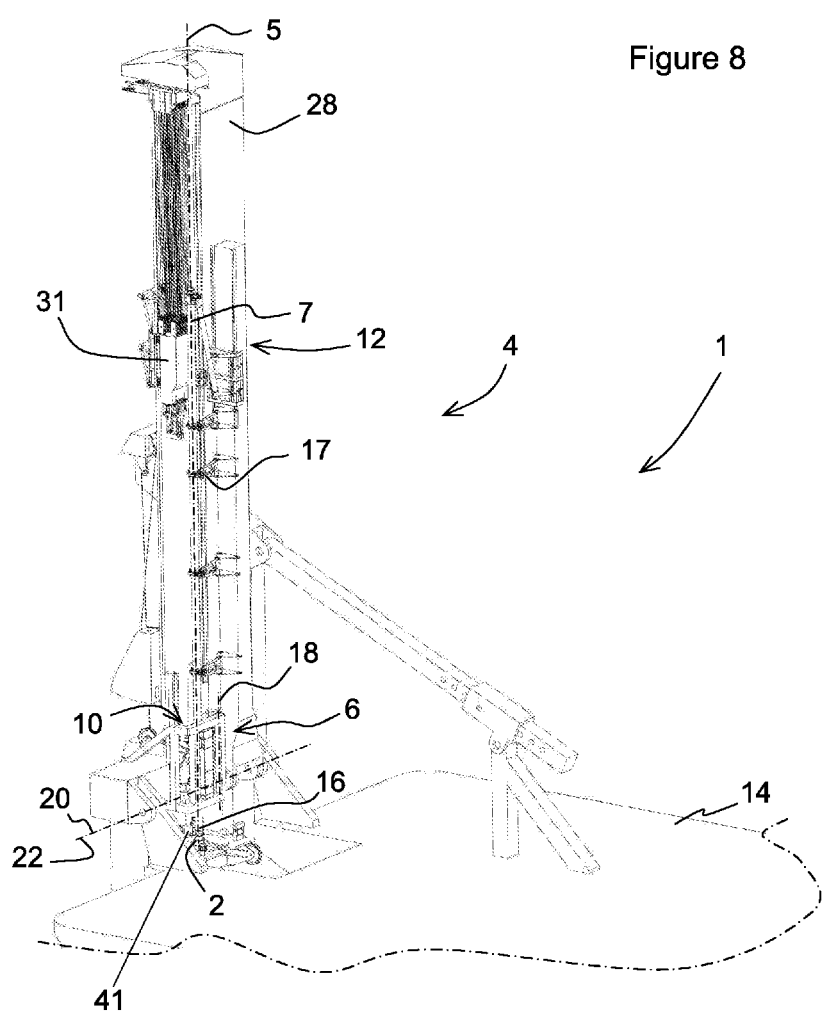

FIG. 8 shows a subsequent step wherein the suspension member 31 is raised to a position between the remote lower position 34 and the remote upper position 35. The alignment device 6 with the engaged first pipe section 7 is positioned in the first position 10. The lining up of the first pipe section 1 to the pipeline 2 and/or connecting of the first pipe section 7 with the pipeline 2 may commence. The connecting is performed by welding, typically in the welding station 41. Welding a pipe section to a pipeline in a J-lay system requires a substantial level of accuracy of the alignment process. Typical line up accuracies lie in the range of 0.1 to 0.5 mm for riser pipes and 0.5 to 2 mm for flowline pipes.

Figure 9:
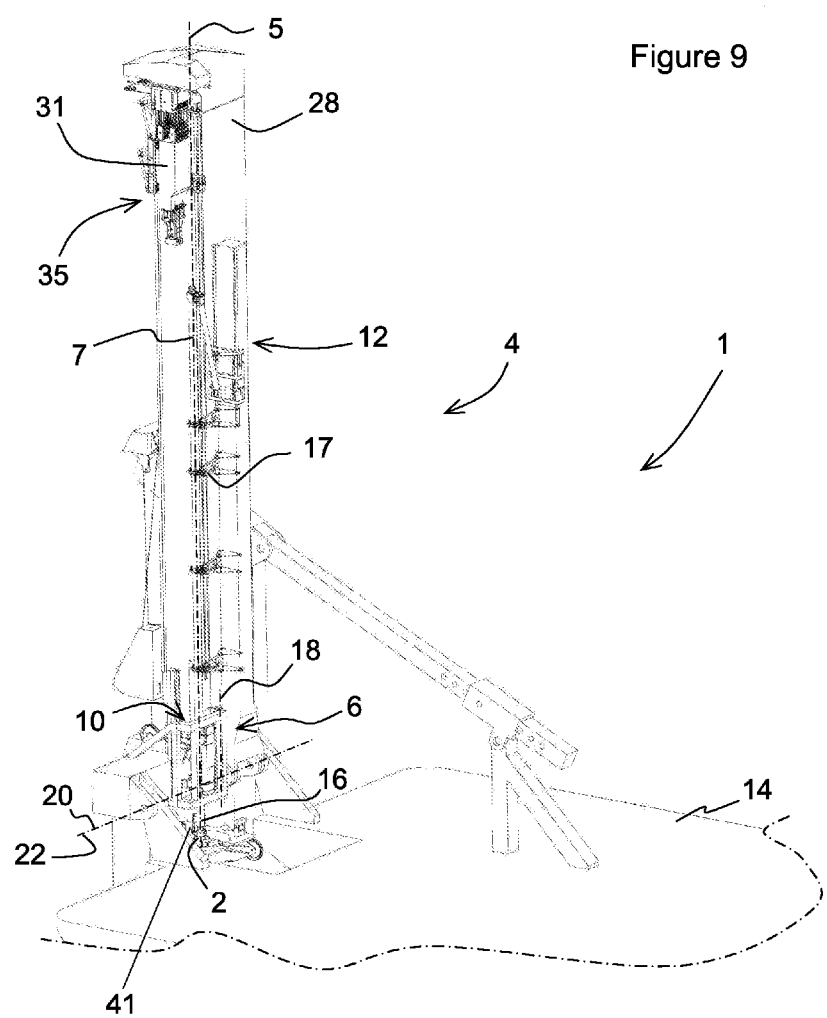

FIG. 9 shows a subsequent step wherein the suspension member 31 is moved into the remote upper position. If the lining up of the first pipe section 1 to the pipeline 2 and/or connecting of the first pipe section 7 with the pipeline 2 has started, it may be continued simultaneously.

Figure 10:
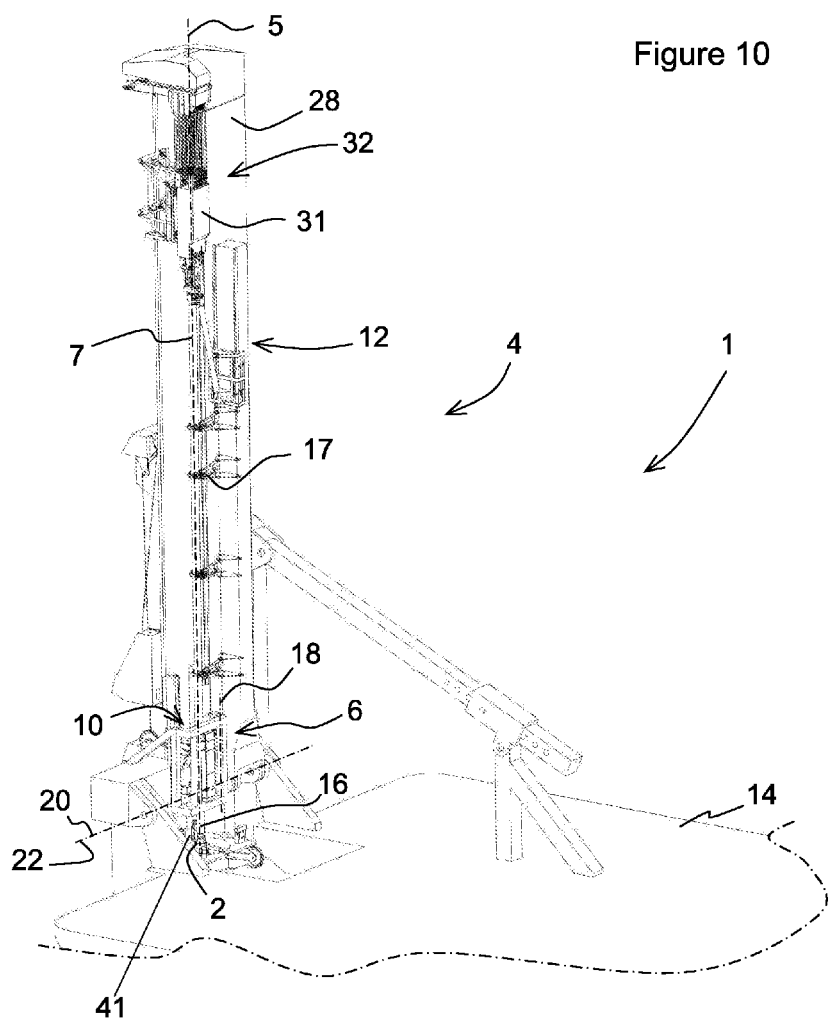

FIG. 10 shows a subsequent step wherein the suspension member 31 is moved into the upper position 32 and engaging the first pipe section 7. If the lining up of the first pipe section 1 to the pipeline 2 and/or connecting of the first pipe section 7 with the pipeline 2 has started, it may be continued simultaneously.

Figure 11:
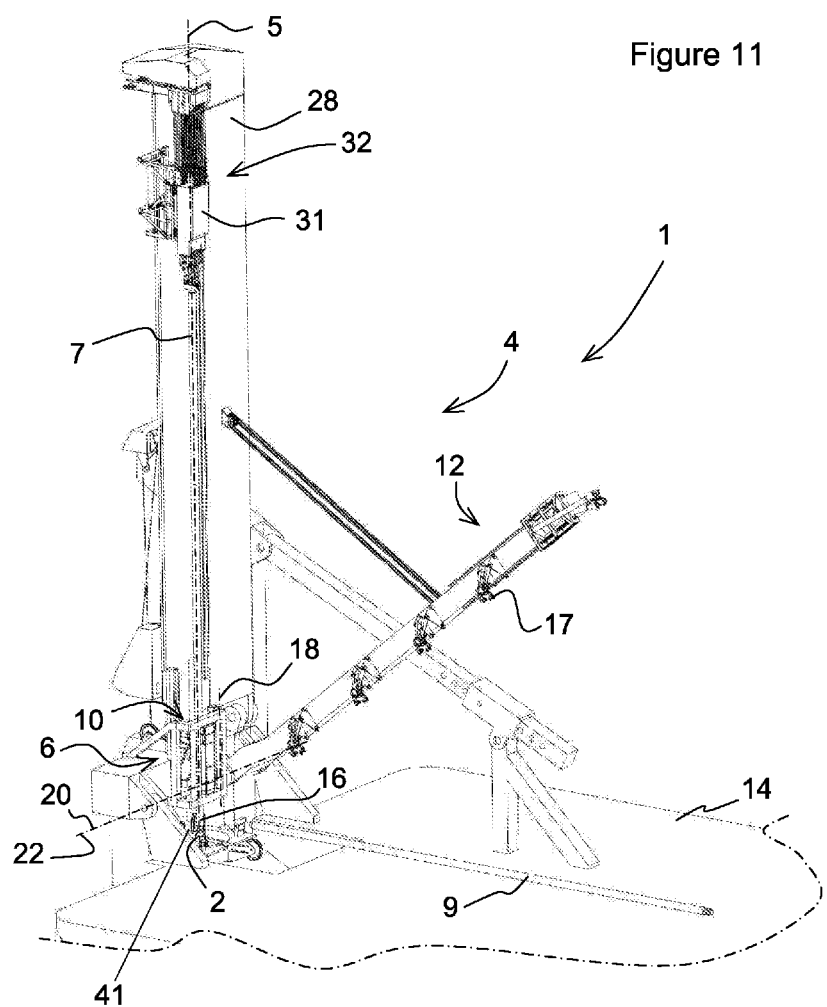

FIG. 11 shows a subsequent step wherein the pipe section loader 12 is disengaged from the first pipe section 7 and moved towards the deck surface 14. The suspension member 31 holds the top of the first pipe section 7. The alignment device 6 is used to align the lower end 16 first pipe section 7 with the pipeline 2. Said aligning may also be performed while the pipe section loader 12 is still connected to the first pipe section 7.

Figure 12:
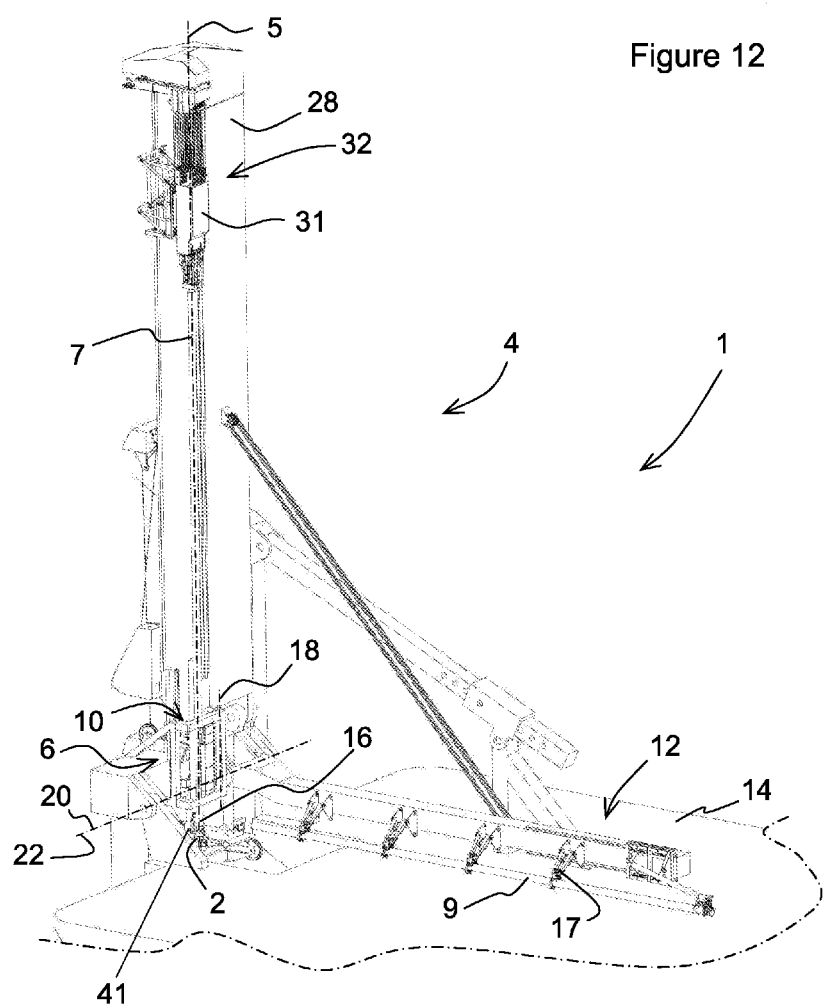

FIG. 12 shows a subsequent step wherein the first pipe section 7 is connected to the pipe line 2. The pipe section loader 12 is lowered such that the pipe section loader 12 is positioned substantially parallel to the deck surface 14 and holds a third pipe section 9.

Figure 13:
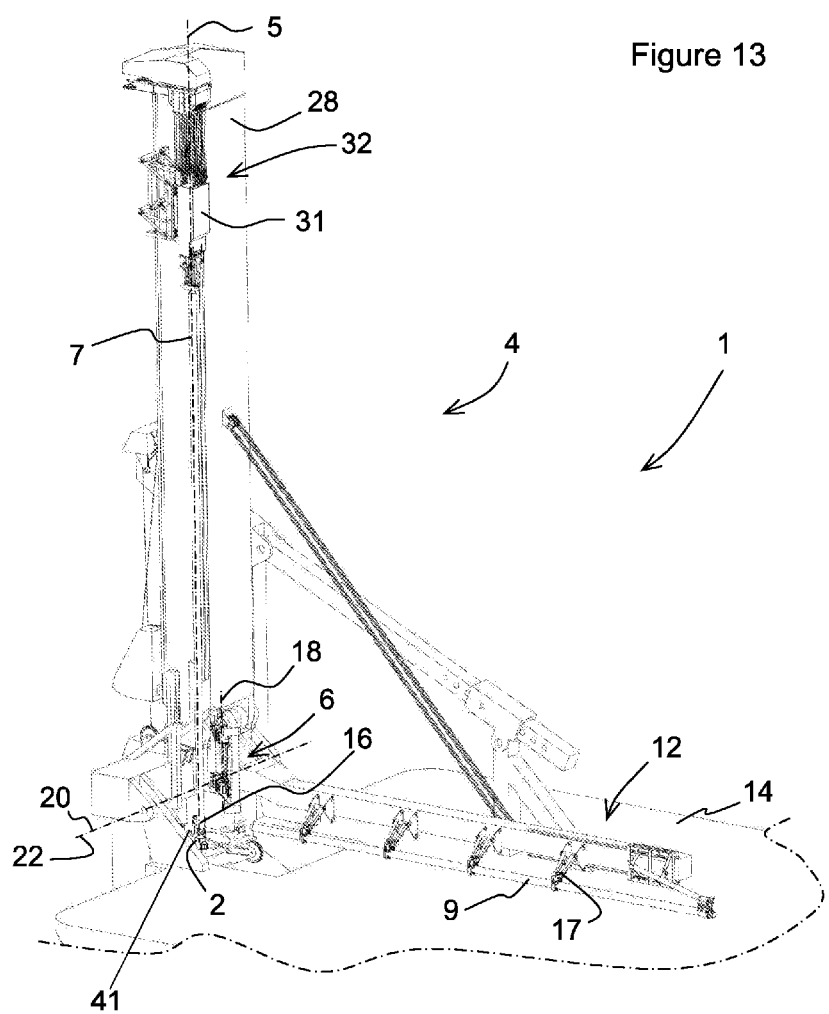

FIG. 13 shows a subsequent step wherein the connection of the first pipe section 7 to the pipe line 2 is completed. The alignment device 6 is disengaged from the first pipe section 7 and moved towards the second position.

Figure 14:
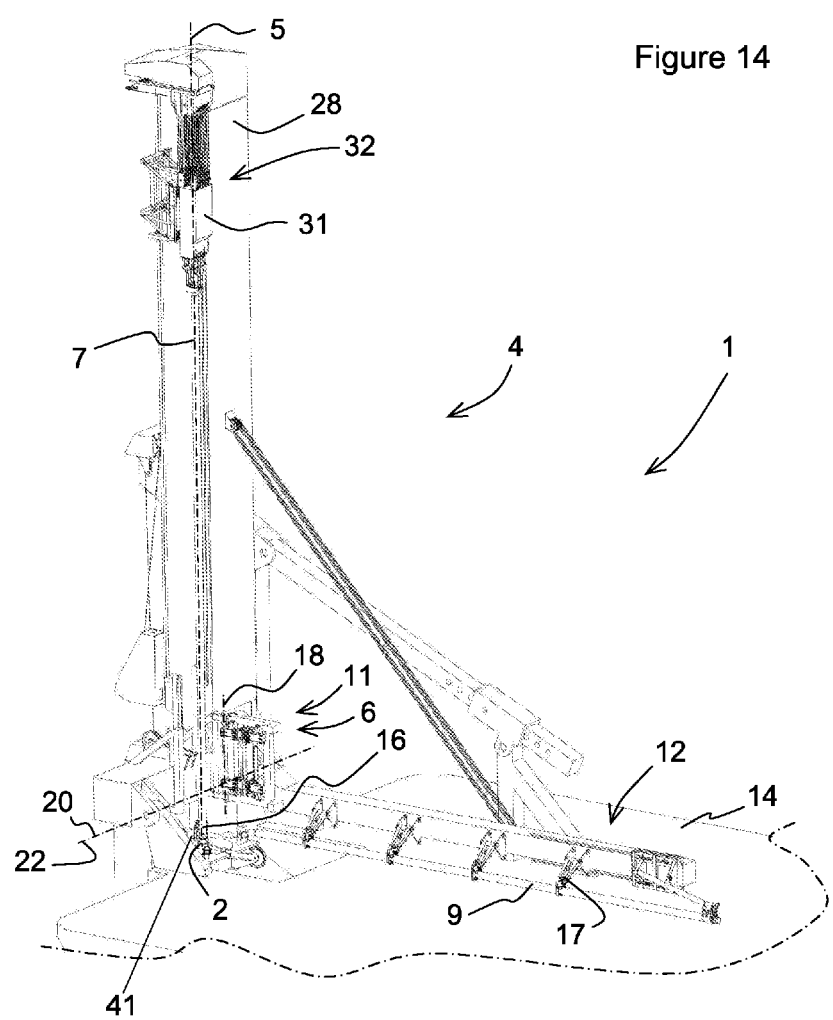

FIG. 14 shows a subsequent step wherein the alignment device 6 is moved into the second position. Work on the connection between the first pipe section 7 and the pipeline 2 may continue simultaneously. Said connection may for example be treated by applying a coating layer on the connection.

Figure 15:
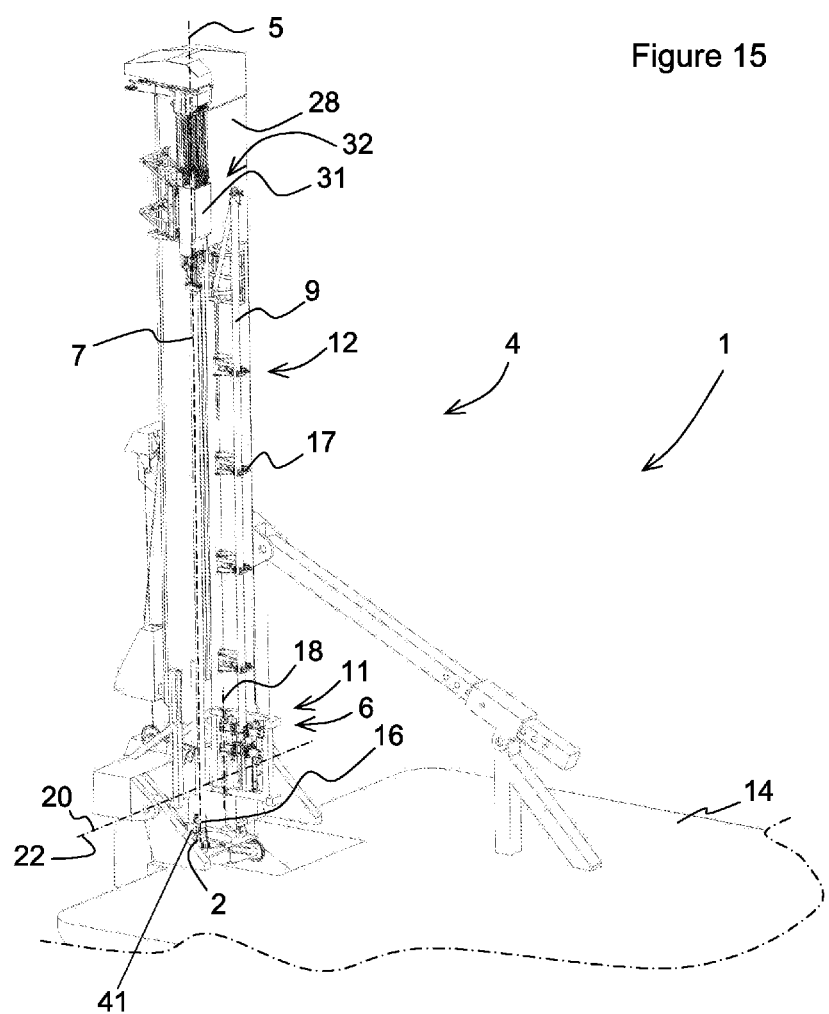

FIG. 15 shows a subsequent step wherein the third pipe section 9 is moved by the pipe section loader 12 to a position substantially parallel to the firing line 5 in the alignment device 6 located in the second position 11. The cycle shown in the FIG. 2-15 is subsequently repeated.

It will be clear to the person skilled in the art that many modifications of the invention are possible without departing from the scope of protection as claimed in the description, figures and claims.

The invention claimed is:

1. A pipeline laying vessel for laying a pipeline on a seabed, said vessel comprising:
    a welding station,
    a J-lay system defining a firing line along which the pipeline is laid, the J-lay system comprising:
    an alignment device for aligning a first pipe section in a working location in the firing line with the pipeline which is also in said firing line, the working location being located above said welding station, the pipeline being suspended from the J-lay system, the alignment device performing the alignment with a sufficient level of accuracy to allow a lower end of the first pipe section to be welded to the pipeline in the welding station, the alignment device being constructed to maintain the alignment of the first pipe section and the pipeline during at least a part of the welding operation of the first pipe section to the pipeline,
    wherein the alignment device is movable between a first alignment device position at the firing line and a second alignment device position which is remote from the firing line,
    wherein the alignment device is constructed to engage the first pipe section in the second alignment device position while a second pipe section, which is connected to the pipeline before said first pipe section, is still at least partially in the working location above the welding station, the alignment device being constructed to move said first pipe section to the working location in the firing line after the second pipe section has been connected to the pipeline and has been lowered by the J-system, wherein the alignment device is configured to be disengaged from the first pipe section in the working location and to be moved to the second alignment device position while the first pipe section remains in the working location, and wherein the vessel comprises a pipe section loader for positioning the first pipe section substantially parallel to the firing line and near or in the alignment device located in the second alignment device position.

2. The pipeline laying vessel according to claim 1, wherein the alignment device is independently movable relative to the pipe section loader.

3. The pipeline laying vessel according to claim 1, wherein the alignment device is free from a connection to the pipe section loader.

4. The pipeline laying vessel according to claim 1, wherein the alignment device is indirectly connected to an elongate structure of the J-lay system.

5. The pipeline laying vessel according to claim 1, wherein the vessel comprises a deck, and the alignment device is connected to the deck of the vessel.

6. The pipeline laying vessel according to claim 1, wherein the pipe section loader is constructed to move the pipe section in a direction of the longitudinal axis of said pipe section.

7. The pipeline laying vessel according to claim 6, wherein the pipe section loader is constructed to move the pipe section in a direction of the longitudinal axis of said pipe section for positioning the pipe section in the alignment device located in the second alignment device position.

8. The pipeline laying vessel according to claim 7, wherein the pipe section loader comprises holding means for engaging the pipe section.

9. The pipeline laying vessel according to claim 8, wherein the holding means are constructed to move the pipe section in the direction of the longitudinal axis of said pipe section.

10. The pipeline laying vessel according to claim 1, wherein the alignment device is pivotable about an alignment pivot axis and between the first alignment device position and the second alignment device position.

11. The pipeline laying vessel according to claim 10, wherein the alignment pivot axis extends parallel to the firing line.

12. The pipeline laying vessel according to claim 1, wherein the alignment device comprises an alignment drive for moving the alignment device between the first alignment device position and the second alignment device position.

13. The pipeline laying vessel according to claim 1, wherein the pipe section loader is pivotable about a loader pivot axis.

14. The pipeline laying vessel according to claim 1, wherein the J-lay system is pivotable about a J-lay pivot axis.

15. Pipeline laying vessel according to claim 14,
wherein the vessel comprises a pipe section loader for positioning a pipe section substantially parallel to the firing line and near or in the alignment device located in the second alignment device position; and
wherein the pipe section loader is pivotable about a loader pivot axis and wherein the loader pivot axis and the J-lay pivot axis extend parallel to each other.

16. The pipeline laying vessel according to claim 15, wherein the loader pivot axis and the J-lay pivot axis coincide.

17. A method for laying a pipeline on a seabed with a pipeline laying vessel comprising:
providing a J-lay system for laying a pipeline along a firing line, the J-lay system comprising:
a welding station,
an alignment device for aligning a first pipe section in a working location in the firing line with the pipeline which is also in said firing line, the working location being located above said welding station, the pipeline being suspended from the J-lay system, the alignment device performing the alignment with a sufficient level of accuracy to allow a lower end of the first pipe section to be welded to the pipeline in the welding station, the alignment device being constructed to maintain the alignment of the first pipe section and the pipeline during at least a part of the welding operation of the pipe section to the pipeline,
wherein
the alignment device is movable between a first alignment device position at the firing line and a second alignment device position which is remote from the firing line,
providing a pipe section loader for positioning the pipe section,
positioning the pipe section with the pipe section loader substantially parallel to the firing line and near or in the alignment device located in the second alignment device position,
engaging the first pipe section with the alignment device in the second alignment device position, while a second pipe section which is connected to the pipeline before said first pipe section is still at least partially in the working location above the welding station,
moving the first pipe section to the working location in the firing line by the alignment device after the second pipe section has been connected to the pipeline and has been lowered by the J-lay system, and
disengaging the alignment device from the first pipe section in the working location and moving the alignment device to the second alignment device position while the first pipe section remains in the working location.

18. The method according to claim 17, wherein
the pipe section loader comprises holding means for engaging the pipe section, and
the pipe section loader moves simultaneously with the alignment device during the moving of the engaged pipe section to the working location in the firing line.

19. The method according to claim 17, wherein the method comprises a first previous step of positioning the alignment device in the second alignment device position.

20. The method according to claim 17, wherein the method comprises a second subsequent step of positioning a further pipe section with the pipe section loader substantially parallel to the firing line and near or in the alignment device located in the second alignment device position, while the first pipe section connected to the pipeline is treated and/or lowered towards the seabed.

21. A method for laying a pipeline on a seabed comprising:
utilizing the pipe laying vessel according to claim 1 to lay the pipeline on a seabed.

* * * * *